United States Patent
Nelkenbaum

(10) Patent No.: US 9,237,424 B2
(45) Date of Patent: Jan. 12, 2016

(54) SYSTEM AND METHOD FOR CORRELATION OF MOBILE COMMUNICATION TERMINALS AND INDIVIDUALS AT CONTROL CHECKPOINTS

(75) Inventor: Yossi Nelkenbaum, Ramat—Gan (IL)

(73) Assignee: VERINT SYSTEMS LTD., Herzella, Pituach (IL)

( * ) Notice: Subject to any disclaimer, the term of this patent is extended or adjusted under 35 U.S.C. 154(b) by 525 days.

(21) Appl. No.: 13/253,935

(22) Filed: Oct. 5, 2011

(65) Prior Publication Data

US 2012/0086555 A1 Apr. 12, 2012

(30) Foreign Application Priority Data

Oct. 6, 2010 (IL) .......................................... 208508

(51) Int. Cl.
*H04Q 5/22* (2006.01)
*G06K 5/00* (2006.01)
*H04W 4/04* (2009.01)
*H04W 12/12* (2009.01)
*H04L 29/06* (2006.01)

(52) U.S. Cl.
CPC ............. *H04W 4/043* (2013.01); *H04L 63/304* (2013.01); *H04W 12/12* (2013.01)

(58) Field of Classification Search
CPC .................................... H04Q 5/22; G06K 5/00
USPC ....................................................... 340/10.1
See application file for complete search history.

(56) References Cited

U.S. PATENT DOCUMENTS

| | | | | |
|---|---|---|---|---|
| 7,374,096 | B2 * | 5/2008 | Overhultz et al. ............ | 235/487 |
| 8,215,546 | B2 * | 7/2012 | Lin et al. ........................ | 235/382 |
| 8,496,169 | B2 * | 7/2013 | Christofferson .............. | 235/382 |
| 2010/0078475 | A1 | 4/2010 | Linn et al. | |

FOREIGN PATENT DOCUMENTS

WO 2010116292 A2 10/2010

OTHER PUBLICATIONS

Daehyun Strobel, "IMSI Catcher," Jul. 13, 2007, Seminar Work, Ruhr University, Bochum, Germany, pp. 1-28.*
Strobel, Daehyun, IMSI Catcher, Jul. 13, 2007, Seminar at Ruhr-Universitat Bochum, pp. 1-24.*
3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Jennifer Mehmood
*Assistant Examiner* — John Mortell
(74) *Attorney, Agent, or Firm* — Meunier Carlin & Curfman

(57) ABSTRACT

Methods and systems for correlating mobile communication terminals with individuals. The methods and systems take advantage of scenarios where individuals pass through control checkpoints, such as passport control and immigration counters. When an individual is served by a control checkpoint, the individual's mobile communication terminal is known to be located in a well-localized geographical area. At the same time, the individual voluntarily provides some identification information, such as his passport details. Thus, this scenario presents an opportunity to correlate the mobile communication terminal and its user with high reliability.

20 Claims, 2 Drawing Sheets

(56) References Cited

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Vedaldi, Andrea, "An implementation of SIFT detector and descriptor," University of California at Los Angeles, 7 pages.

Girardin, Fabien, et al., "Detecting air travel to survey passengers on a worldwide scale," Journal of Location Based Services, 26 pages.

Meyer, Ulrike, et al., "On the Impact of GSM Encryption and Man-in-the-Middle Attacks on the Security of Interoperating GSM/UMTS Networks," IEEE, 2004, 8 pages.

* cited by examiner

SYSTEM AND METHOD FOR CORRELATION OF MOBILE COMMUNICATION TERMINALS AND INDIVIDUALS AT CONTROL CHECKPOINTS

FIELD OF THE DISCLOSURE

The present disclosure relates generally to communication interception, and particularly to correlating individuals and mobile communication terminals at control checkpoints.

BACKGROUND OF THE DISCLOSURE

Control checkpoints, such as passport control checkpoints, immigration counters, check-in counters and airport departure gates, are used by authorities for identifying individuals and collecting information. Control checkpoints are an important source of information, which can be used, for example, for various homeland security and crime prevention purposes.

SUMMARY OF THE DISCLOSURE

An embodiment that is described herein provides a method, including:

while an individual identifies at a control checkpoint, automatically identifying a mobile communication terminal that is carried by the individual;

communicating with the identified mobile communication terminal so as to extract an identifier of the mobile communication terminal; and correlating the extracted identifier of the mobile communication terminal with identification information provided by the individual at the control checkpoint.

In some embodiments, automatically identifying the mobile communication terminal includes soliciting the mobile communication terminal to communicate with at least one interrogation device having a coverage footprint that covers the control checkpoint. In an embodiment, automatically identifying and communicating with the mobile communication terminal include operating the at least one interrogation device in multiple respective coverage footprints that cover multiple respective control checkpoints.

Operating the at least one interrogation device may include operating a single interrogation device connected to multiple antennas that produce the multiple respective coverage footprints. In another embodiment, operating the at least one interrogation device includes defining the coverage footprints so as to reduce overlap among the coverage footprints. In yet another embodiments, operating the at least one interrogation device includes alternating operation of the interrogation device in time among the multiple coverage footprints.

In a disclosed embodiment, automatically identifying the mobile communication terminal includes receiving a request from an operator of the control checkpoint, and identifying the mobile communication terminal in response to the request. In an embodiment, communicating with the identified mobile communication terminal includes notifying an operator of the control checkpoint whether the identifier has been extracted successfully. In another embodiment, communicating with the identified mobile communication terminal includes attaching a first time stamp to the extracted identifier, and correlating the extracted identifier with the identification information includes synchronizing the first time stamp with a second time stamp that is attached to the identification information.

In some embodiments, the identification information includes an image of the individual. In an embodiment, the extracted identifier includes at least one identifier type selected from a group of types consisting of an International Mobile Subscriber Identity (IMSI), an International Mobile Equipment Identity (IMEI) and a Temporary Mobile Subscriber Identity (TMSI) of the mobile communication terminal.

There is additionally provided, in accordance with an embodiment that is described herein, apparatus, including:

at least one interrogation device, which is configured to automatically identify a mobile communication terminal that is carried by an individual while the individual identifies at a control checkpoint, and to communicate with the identified mobile communication terminal so as to extract an identifier of the mobile communication terminal; and a correlation processor, which is configured to correlate the extracted identifier of the mobile communication terminal with identification information provided by the individual at the control checkpoint.

The present disclosure will be more fully understood from the following detailed description of the embodiments thereof, taken together with the drawings in which:

DETAILED DESCRIPTION OF EMBODIMENTS

Overview

Figure 1:
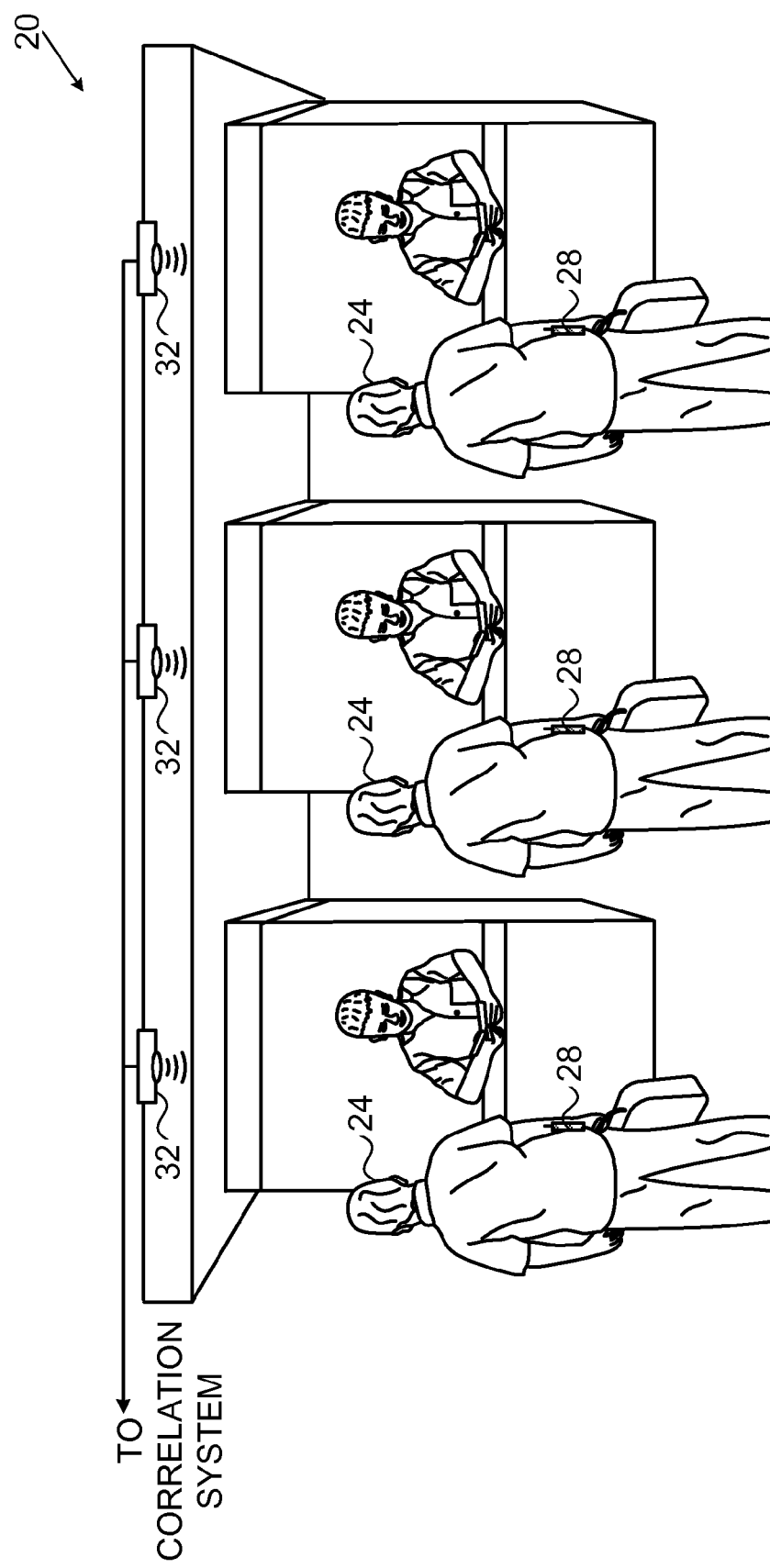
FIG. 1 is a pictorial, schematic illustration of a system for collecting information at control checkpoints, in accordance with an embodiment that is described herein.

Tracking of mobile communication terminals, such as cellular phones, is an important surveillance tool in many anti-terrorist and crime prevention applications. In many cases, however, it is difficult to correlate communication terminals with the individuals who carry them. In particular, hostile users often take measures to prevent tracking of their mobile communication terminals.

Embodiments that are described herein provide improved methods and systems for correlating mobile communication terminals with individuals. These methods and systems take advantage of scenarios where individuals pass through control checkpoints, such as passport control and immigration counters. When an individual is served by a control checkpoint, the individual's mobile communication terminal is known to be located in a well-localized geographical area. At the same time, the individual voluntarily provides some identification information, such as his passport details. A scenario of this sort presents a valuable opportunity to correlate the mobile communication terminal and its user with high reliability.

In some embodiments, an interrogation device is installed at the control checkpoint. When an individual is served by the checkpoint, the interrogation device communicates with the individual's mobile communication terminal and extracts an identifier of the terminal. A correlation system accepts the extracted identifier from the interrogation device, as well as the identification information that is provided by the individual (e.g., by interfacing with a computerized system of the checkpoint). The correlation system correlates the identifier of the terminal with the identification information of the individual.

Typically, the interrogation device has a well-defined coverage footprint that is confined to the immediate vicinity of the checkpoint, in order to avoid false correlations with other nearby communication terminals. In some embodiments, the correlation system is connected to multiple interrogation devices that cover multiple respective checkpoints (e.g., a row of immigration counters). In an example embodiment, the interrogation devices are activated in alternation in order to avoid mutual interference. In an alternative embodiment, a single interrogation device is connected to multiple antennas that cover the multiple checkpoints, respectively. Various mechanisms can be used for differentiating between communication terminals at different checkpoints in this embodiment.

In some embodiments, the correlation system obtains the individual's identification information by interfacing with an Information Technology (IT) system of the checkpoint. In alternative embodiments, the correlation system obtains the individual's identification information independently, e.g., using a camera installed at the checkpoint. Several example system configurations are described herein. Some system configurations perform off-line data collection, whereas other configurations perform real-time alerting.

The disclosed techniques are highly reliable in correlating mobile communication terminals with individuals. In particular, these techniques are effective against hostile users who change phones frequently, use fake, stolen or prepaid phones, or take other obfuscation measures. The correlations found using the disclosed techniques enable authorities to track suspect individuals and prevent crimes and terrorist events with high reliability.

System Description

FIG. 1 is a pictorial, schematic illustration of a system 20 for collecting information at control checkpoints, in accordance with an embodiment that is described herein. In the present example, system 20 is installed in a row of passport control checkpoints at an airport. Alternatively, however, a system of this sort may be used in any other kind of control checkpoint, such as immigration counters, check-in counters and airport departure gates. Although the embodiments described herein refer to airports, the disclosed techniques can be used in checkpoints that operate in any other suitable location or environment, such as seaports and border crossings. Other kinds of checkpoints may comprise, for example, security screening checkpoints at public buildings.

Some individuals 24 that are served by the control checkpoints carry mobile communication terminals, such as mobile phones 28. Although the embodiments described herein refer mainly to mobile phones, the disclosed techniques can be used with various other types of communication terminals, such as wireless-enabled portable computers, Personal Digital Assistants (PDAs), and/or any other suitable type of mobile terminal having communication capabilities.

In the example of FIG. 1, system 20 comprises multiple interrogation devices 32. Each interrogation device 32 has a predefined coverage footprint that covers the immediate vicinity of a respective checkpoint. In the configuration of FIG. 1, each interrogation device 32 is installed above its respective checkpoint with a downward-looking directional antenna. In alternative embodiments, any other suitable installation scheme can also be used. The system may comprise any desired number of interrogation devices 32, and in some embodiments only a single interrogation device. The system may cover any desired number of checkpoints, e.g., from a single checkpoint to ten checkpoints or more. An alternative embodiment, in which a single interrogation device 32 covers multiple checkpoints using multiple respective antennas, is described further below.

Each interrogation device 32 is capable of identifying mobile communication terminals 28 that are located in its coverage area, establishing communication with the detected terminals and extracting one or more identifiers of the terminals. The interrogation device may extract any suitable identifier, such as an International Mobile Subscriber Identity (IMSI), International Mobile Equipment Identity (IMEI) or Temporary Mobile Subscriber Identity (TMSI), of a detected terminal. In an example embodiment, extracting the identifier of a given mobile communication terminal takes no more than thirty seconds. Alternatively, however, any other suitable time interval may also be used.

Typically, the interrogation device imitates the operation of a base station, so as to solicit the communication terminal to establish communication with the interrogation device. After extracting the terminal's identifier, the interrogation device typically returns the terminal back to the locally-available wireless network with which the terminal communicated previously. The entire solicitation and extraction process is usually transparent to the terminal user. In an example embodiment, the interrogation device solicits the terminal by producing a signal that is stronger (at the terminal) than the signals of the wireless network with which the terminal communicates.

Interrogation devices of this sort are sometimes referred to as "IMSI catchers." Examples of IMSI catching techniques are described, for example, by Strobel in "IMSI Catcher," Jul. 13, 2007, which is incorporated herein by reference, by Asokan et al., in "Man-in-the-Middle Attacks in Tunneled Authentication protocols," the 2003 Security Protocols Workshop, Cambridge, UK, Apr. 2-4, 2003, which is incorporated herein by reference, and by Meyer and Wetzel in "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, Barcelona, Spain, Sep. 5-8, 2004, pages 2876-2883, which is incorporated herein by reference.

Any of these known schemes, as well as any other suitable type of interrogation device, can be used to implement interrogation devices 32 of system 20. As yet another example, Verint Systems Inc. (Melville, N.Y.) offers a system called ENGAGE™ that can be used for this purpose. Typically, the interrogation devices are detached and separate from the communication network or networks via which terminals 28 communicate.

Interrogation devices 32 may interrogate communication terminals that operate in accordance with any suitable standard or protocol, such as Global System for Mobile Communications (GSM) or Universal Mobile Telecommunications System (UMTS). In an example embodiment, a single interrogation device covers between two and six communication networks (e.g., GSM and/or UMTS networks) simultaneously. Alternatively, a given checkpoint may be equipped with multiple interrogation devices for covering multiple networks.

In some embodiments, each interrogation device is installed and configured such that its coverage area (coverage footprint) is confined to a well-localized region in the immediate vicinity of the respective checkpoint. As such, if the interrogation device identifies the presence of a certain terminal 28, there is high likelihood that the individual carrying this terminal is currently served by the checkpoint.

When the individual in question identifies at the checkpoint, he or she provides some identification information. In a passport control checkpoint, for example, the individual provides his passport details—e.g., passport number, name, country-of-origin and/or other personal details. In other types of checkpoints the individual may provide other details, such as personal information that appear on his driving license. Some of this identification information may be textual. Other identification information may be visual, e.g., a photograph or image of the individual that is extracted from his passport or acquired by the checkpoint. Typically, these details are entered (manually or automatically) into a computerized system of the checkpoint.

In some embodiments, identification of the individual and entry of the identification information is performed manually by a checkpoint operator (e.g., immigration officer or airline representative). In other embodiments, identification of the individual and entry of the identification information is performed automatically, e.g., by automatically decoding a barcode on the individual's documentation, acquiring an image of the individual's face by a camera or using a biometric system that identifies the individual.

Thus, when an individual 24 is served by a given checkpoint, the computerized system of the checkpoint is provided with identification information regarding the individual. At the same time, interrogation device 32 of that checkpoint obtains an identifier of the individual's mobile communication terminal 28. These two types of information are provided to a correlation system (not shown in FIG. 1) that correlates them with one another, as will be explained below.

Figure 2:
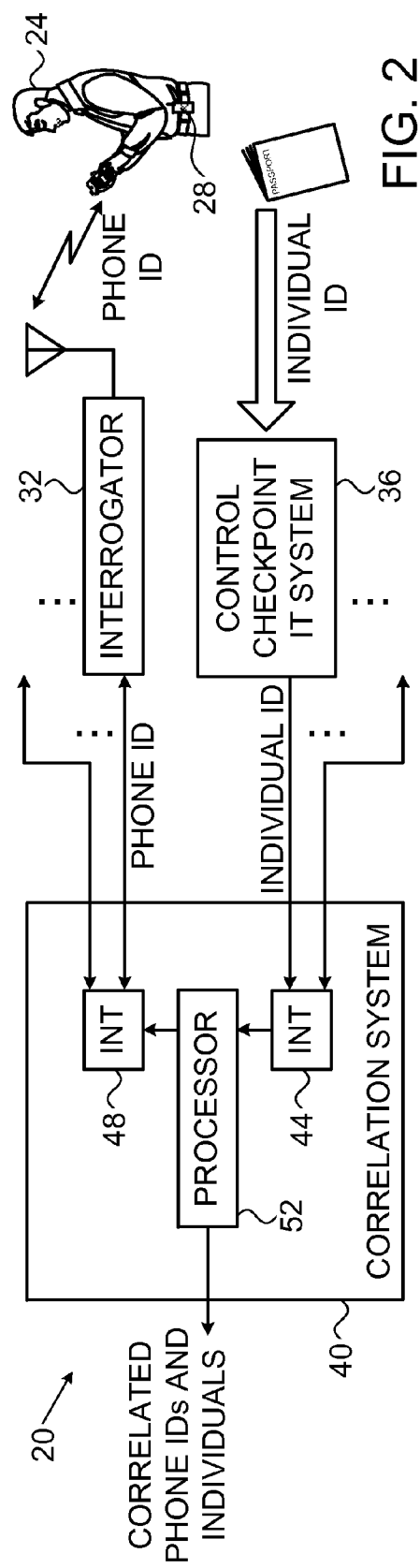
FIG. 2 is a block diagram that schematically illustrates a system for collecting information at control checkpoints, in accordance with an embodiment that is described herein.

FIG. 2 is a block diagram that schematically illustrates system 20, in accordance with an embodiment that is described herein. System 20 may support one or more checkpoints. The system comprises a respective interrogation device 32 for each checkpoint. System 20 comprises a checkpoint Information Technology (IT) system 36, also referred to as a computerized system of the checkpoint. IT system 36 is provided (manually or automatically) with the identification information that the individual provides at the checkpoint.

System 20 comprises a correlation system 40, which correlates the identifiers of the mobile communication terminals with the identification information provided by the individuals at the checkpoints. Correlation system 40 comprises an interrogator interface 48, which accepts the extracted identifiers of the mobile communication terminals from interrogation devices 32. Correlation system 40 also comprises an IT interface 44, which accepts the identification information of the individuals from IT system 36. A correlation processor 52 correlates the identifiers with the identification information.

When performing a given correlation, correlation system 40 links an individual (who presented his identification information while served by the checkpoint) with a mobile communication terminal (which was identified by an interrogation device as being located at the checkpoint while the individual in question was served). In an example embodiment, interrogation devices 32 attach time stamps to the extracted identifiers, and IT system 36 attaches time stamps to the entered identification information. Correlation processor 52 in this example correlates the extracted identifiers and identification information, for a given checkpoint, by synchronizing the time stamps.

Correlation system 40 typically provides the resulting correlations between communication terminal identifiers (e.g., IMSI, IMEI or TMSI) and individuals as output. The correlations may be presented to an operator, used for triggering alerts, stored in a suitable database or other data structure, provided to another computerized system over a suitable interface, or output in any other suitable manner.

The configurations of FIGS. 1 and 2 are example configurations, which are chosen purely for the sake of conceptual clarity. In alternative embodiments, any other suitable system configuration can also be used. For example, the functions of correlation processor 52 can be integrated with various other analytics functions. The disclosed techniques are applicable to human-operated checkpoints, as well as automated or automatic checkpoints (e.g., biometric checkpoints).

The elements of system 20 may be implemented in hardware, in software, or using a combination of hardware and software elements. In some embodiments, correlation processor 52 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, processor 52 activates a given interrogation device in response to a request from an operator of the respective checkpoint. The checkpoint operator may issue such a request in various ways, for example by pushing a dedicated "mobile phone intercept" button, using another dedicated user interface, or via IT system 36. In alternative embodiments, interrogation devices 32 operate irrespective of requests from checkpoint operators. This feature enables the checkpoint operator to apply the disclosed techniques selectively, e.g., for individuals who are suspected for some reason. Such a selective operation reduces or avoids violation of privacy.

In some embodiments, processor 52 provides feedback to the checkpoint operator, which indicates whether interrogation was performed successfully. The checkpoint operator may decide whether to let the individual through or to delay him, based on the feedback. This technique is useful, for example, when the communication device interrogation process takes a certain time (e.g., on the order of thirty seconds) to complete. The feedback may be provided to the checkpoint operator in any suitable way, e.g., using IT system 36 or using a dedicated user interface.

In some embodiments, system 20 comprises multiple interrogation devices 32 that are located adjacently to one another, e.g., above a row of immigration counters. Typically, each interrogation device comprises a directional antenna that defines a well-localized coverage footprint in the immediate vicinity of the respective checkpoint. The coverage footprints of the interrogation devices are typically designed to have little or no overlap, in order to prevent or minimize interference between adjacent checkpoints. (In addition to minimizing overlap and increasing correlation reliability, the well-localized coverage footprints of the interrogation devices reduce interference to public networks that cover the area in question.)

Nevertheless, in some cases the coverage footprints of adjacent interrogation devices may overlap. Overlaps of this sort may cause false identifications, in which a certain interrogation device identifies a mobile communication terminal of an individual who is served by a different nearby checkpoint. In some embodiments, processor 52 selectively activates and deactivates interrogation devices 32 in time, in order to prevent such false identification.

For example, processor 52 may activate the interrogation devices in alternation, such that only a single interrogation device is active at any given time. As another example, the interrogation devices may be partitioned into two or more subsets such that the interrogation devices within each subset that do not cause interference to one another (e.g., odd and even interrogation devices in a row of checkpoints). In this example, processor 52 may activate the subsets of interrogation devices in alternation. As yet another example, processor 52 may activate a given interrogation device on-demand, in response to a request from an operator of the checkpoint. In this example, processor 52 may avoid interference between interrogation devices by verifying that only a single operator request is responded to at any given time. Further alternatively, processor 52 may prevent false identification by activating the interrogation devices selectively in time in any other suitable manner.

In an alternative embodiment, a single interrogation device 32 covers multiple checkpoints using multiple respective antennas. In this embodiment, a dedicated antenna or antenna assembly is installed at each respective checkpoint. The multiple antennas are connected to the single interrogation device, e.g., over a single Radio Frequency (RF) cable. Typically, each antenna has a coverage footprint that covers the immediate vicinity of its respective checkpoints, and the coverage footprints have little or no overlap. (The physical appearance of such a configuration may resemble the example of FIG. 1 above. In the present example, however, the element that is installed at each checkpoint is only an antenna and not an entire interrogation device.)

In this embodiment, the correlation system may employ various mechanisms for differentiating between mobile communication terminals that operate in different coverage footprints (i.e., located at different checkpoints). For example, the system may comprise a respective RF receiver installed at each checkpoint. Each receiver indicates to the correlation system when a mobile terminal transmits signals near the respective checkpoint. By time-synchronizing the signals received by the single interrogation device with the indications from the RF receivers, correlation processor 52 can determine the checkpoint from which each terminal transmission originates. Using this technique, the correlation processor is able to correlate the mobile terminal identifiers with the correct identification information.

In alternative embodiments, the correlation system can differentiate between different coverage footprints (i.e., different antennas) using any other suitable technique. For example, the system may switch the interrogation device in alternation among the multiple antennas, such that only one antenna is connected to the interrogation device at any given time, or using any other suitable switching scheme that enables differentiation.

In some embodiments, as described above, correlation system 40 obtains the individual's identification information by interfacing with IT system 36 of the checkpoint. In alternative embodiments, correlation system 40 operates in a standalone manner, and in particular obtains the identification information independently of IT system 36, if one exists. For example, the correlation system may be connected to a camera (not shown in the figures) that acquires images of the individuals served by the checkpoint. In this example, the correlation processor correlates the images with the mobile terminal identifiers extracted by interrogation device 32. The correlated identifiers and images may be stored for later use, used for generating real time alerts, or used in any other suitable way.

Information Collection Method Description

Figure 3:
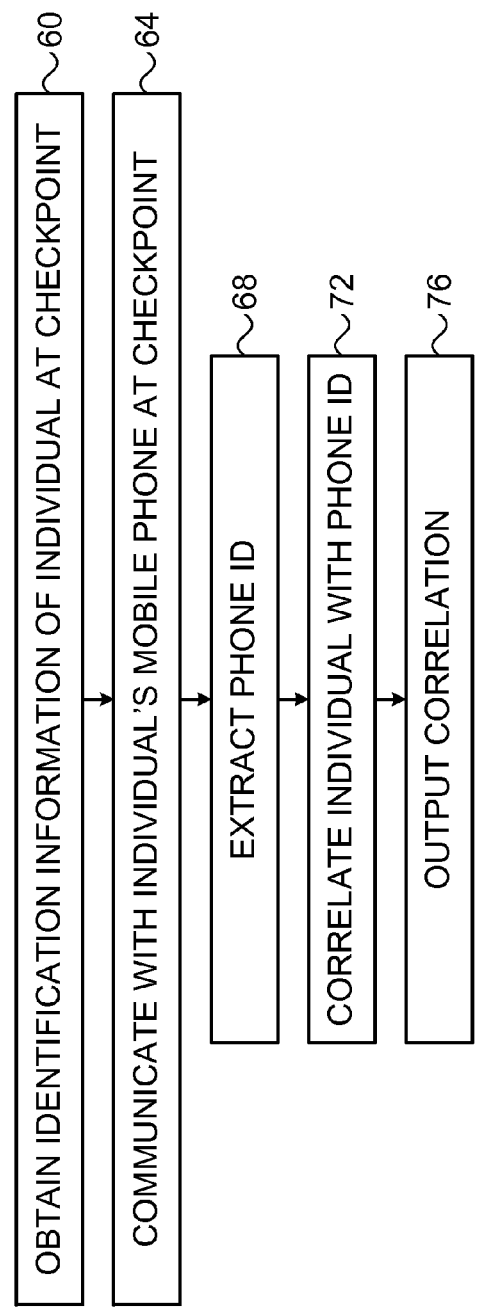
FIG. 3 is a flow chart that schematically illustrates a method for collecting information at control checkpoints, in accordance with an embodiment that is described herein.

FIG. 3 is a flow chart that schematically illustrates a method for collecting information at control checkpoints, in accordance with an embodiment that is described herein. The description that follows refers to a single checkpoint and a single interrogation device for the sake of clarity. The disclosed method can be used, as described above, in a system comprising multiple interrogation devices that handle multiple checkpoints.

The method begins when an individual 24 carrying a mobile phone 28 is served by a certain control checkpoint. The individual provides some identification information at the checkpoint, and the identification information is entered (manually or automatically) to IT system 36, at an identification information entry step 60. While the individual is served by the checkpoint, the interrogation device 32 that covers this checkpoint identifies a mobile phone 28 that is located in its coverage area, and establishes communication with the identified mobile phone, at a phone communication step 64. Since the identified mobile phone is located in the well-localized coverage area of the interrogation device while the individual in question is served by the checkpoint, it can be assumed with high likelihood that the mobile phone is carried by the individual.

Interrogation device 32 extracts an identifier of the identified mobile phone (e.g., IMSI, IMEI or TMSI), at an identifier extraction step 68. Interrogation device 32 and IT system 36 provide correlation system 40 with the extracted identifier and the identification information, respectively. Correlation processor 52 correlates phone 28 with individual 24 based on the identifier and the identification information, at a correlation step 72. Correlation system 40 outputs the resulting correlation, at an output step 76.

The description above refers, for the sake of clarity, to an individual who carries a single mobile communication terminal. In some embodiments, system 20 may identify two or more mobile communication terminals 28 that are carried by a given individual 24 using the disclosed techniques. In these embodiments, interrogation device 32 extracts the identifiers of the multiple terminals carried by the individual, and correlation processor 52 correlates the identification information of this individual with the multiple identifiers.

System 20, whether independent or integrated with IT system 36, may be operated in various manners, depending on the specific application. In some embodiments, the system operates in a data collection manner. In these embodiments, the system accumulates correlations between communication terminal identifiers and individuals' identification information, and stores the correlated information for later use. In alternative embodiments, the system is used for generating real-time alerts. For example, the system may hold a "blacklist" of mobile terminal IMSIs and/or IMEIs that are known or suspected of being associated with target individuals. In this example, the correlation system may issue an alert when a terminal whose identifier appears on the blacklist is identified at a checkpoint. The alert may indicate the identification information provided by the individual at the checkpoint. Hybrid configurations, which perform both off-line data collection and real-time alerting, can also be implemented using the disclosed techniques.

Although the embodiments described herein mainly address control checkpoint, the methods and systems described herein can also be used in other locations in which an individual is relatively isolated and can be correlated reliably with his mobile communication terminal, such as, for example, vending machines or Automatic Teller Machines (ATMs).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method performed by an interrogation device, comprising:
   while an individual identifies at a control checkpoint, automatically locating a mobile communication terminal that is carried by the individual, wherein the mobile communication terminal previously established a first communication with a wireless network base station;
   establishing a second communication between the interrogation device and the located mobile communication terminal, wherein the second communication is established by the interrogation device by:
      providing a connection signal stronger than signals of the wireless network base station and
      imitating an identity of the wireless network base station so that the located mobile communication terminal incorrectly recognizes the interrogation device as being the wireless network base station;
   communicating with the located mobile communication terminal so as to extract an identifier that uniquely identifies the mobile communication terminal; and
   correlating the extracted identifier of the mobile communication terminal with identification information provided by the individual at the control checkpoint.

2. The method according to claim 1, wherein the interrogation device has a coverage footprint that only covers the control checkpoint.

3. The method according to claim 1, wherein automatically locating and communicating with the mobile communication terminal comprise operating the at least one interrogation device in multiple respective coverage footprints that cover multiple respective control checkpoints.

4. The method according to claim 3, wherein operating the at least one interrogation device comprises operating a single interrogation device connected to multiple antennas that produce the multiple respective coverage footprints.

5. The method according to claim 3, wherein operating the at least one interrogation device comprises defining the coverage footprints so as to reduce overlap among the coverage footprints.

6. The method according to claim 3, wherein operating the at least one interrogation device comprises alternating operation of the interrogation device in time among the multiple coverage footprints.

7. The method according to claim 1, wherein automatically locating the mobile communication terminal comprises receiving a request from an operator of the control checkpoint, and the locating of the mobile communication terminal is performed in response to the request.

8. The method according to claim 1, wherein communicating with the located mobile communication terminal comprises notifying an operator of the control checkpoint whether the identifier has been extracted successfully.

9. The method according to claim 1, wherein communicating with the located mobile communication terminal comprises attaching a first time stamp to the extracted identifier, and wherein correlating the extracted identifier with the identification information comprises synchronizing the first time stamp with a second time stamp that is attached to the identification information.

10. The method according to claim 1, wherein the identification information comprises an image of the individual.

11. The method according to claim 1, wherein the extracted identifier comprises at least one identifier type selected from a group of types consisting of an International Mobile Subscriber Identity (IMSI), an International Mobile Equipment Identity (IMEI) and a Temporary Mobile Subscriber Identity (TMSI) of the mobile communication terminal.

12. Apparatus, comprising:
   at least one interrogation device, which is configured to:
      automatically locate a mobile communication terminal that is carried by an individual while the individual identifies at a control checkpoint, wherein the mobile communication terminal previously established a first communication with a wireless network base station;
      establish a second communication between the interrogation device and the located mobile communication terminal by:
         providing a connection signal stronger than signals of the wireless network base station and
         imitating an identity of the base station so that the located mobile communication terminal incorrectly recognizes the interrogation device as being the wireless network base station; and
   a correlation processor, which is configured to correlate the extracted identifier of the mobile communication terminal with identification information provided by the individual at the control checkpoint.

13. The apparatus according to claim 12, wherein the interrogation device has a coverage footprint that only covers the control checkpoint.

14. The apparatus according to claim 12, wherein the at least one interrogation device has multiple coverage footprints that cover multiple respective control checkpoints.

15. The apparatus according to claim 14, wherein the at least one interrogation device comprises a single interrogation device, and comprising multiple antennas that are connected to the single interrogation device so as to produce the multiple respective coverage footprints.

16. The apparatus according to claim 14, wherein the multiple coverage footprints do not overlap one another.

17. The apparatus according to claim 14, wherein the correlation processor is configured to alternate operation of the at least one interrogation device in time among the multiple coverage footprints.

18. The apparatus according to claim 12, wherein the correlation processor is configured to receive a request from an operator of the control checkpoint, and to activate the interrogation device to perform the locating of the mobile communication terminal in response to the request.

19. The apparatus according to claim 12, wherein the interrogation device is configured to attach a first time stamp to the extracted identifier, and wherein the correlation processor is configured to correlate the extracted identifier with the identification information by synchronizing the first time stamp with a second time stamp that is attached to the identification information.

20. The apparatus according to claim 12, wherein the extracted identifier comprises at least one identifier type selected from a group of types consisting of an International Mobile Subscriber Identity (IMSI), an International Mobile Equipment Identity (IMEI) and a Temporary Mobile Subscriber Identity (TMSI) of the mobile communication terminal.

* * * * *